W. S. ELLIOTT.
ROTARY MOTOR.
APPLICATION FILED MAY 22, 1908.
938,228.
Patented Oct. 26, 1909.
2 SHEETS—SHEET 1.
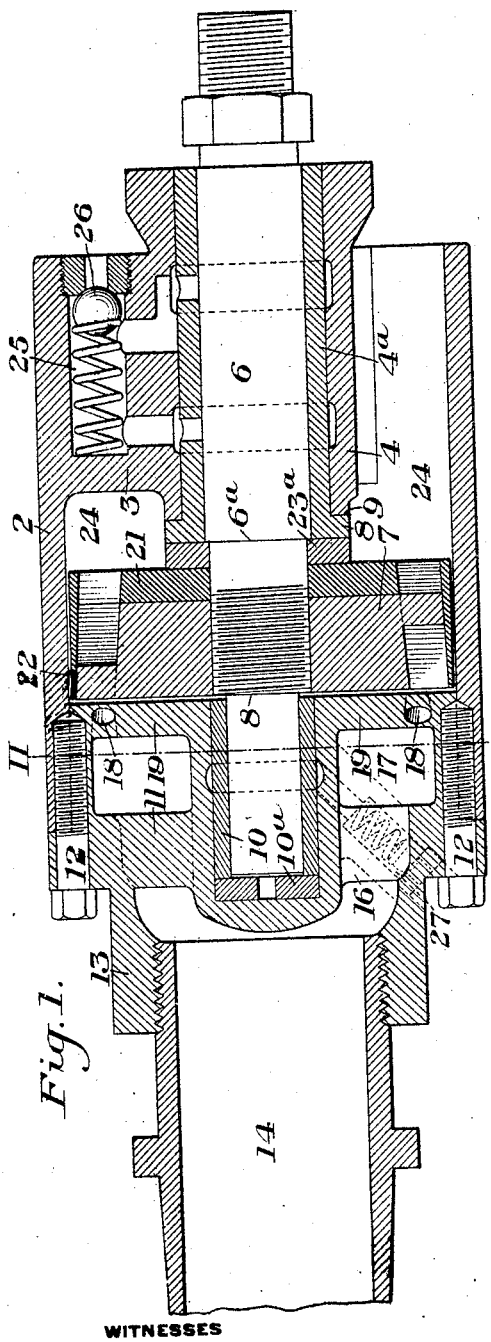
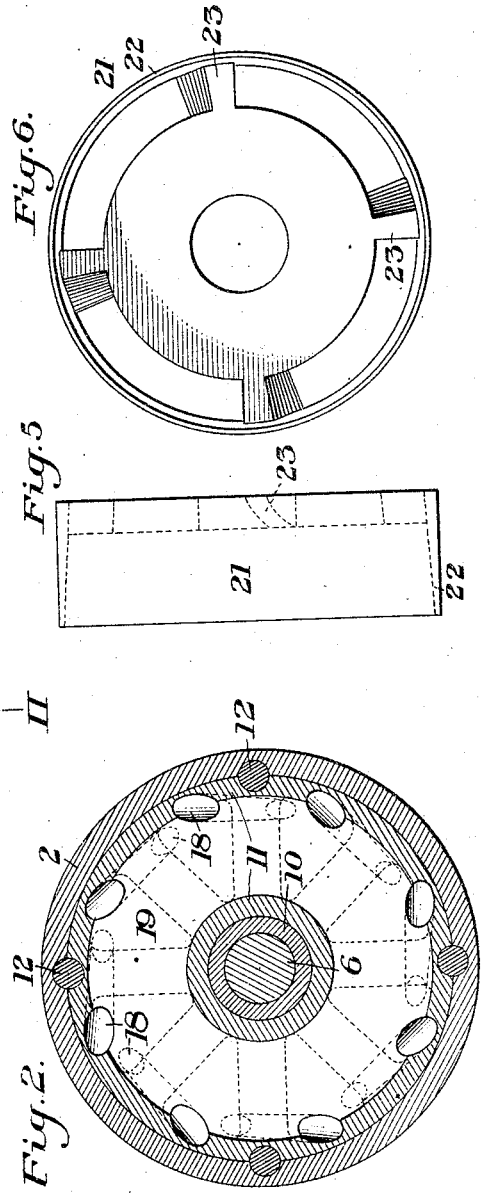
WITNESSES
R. A. Balderson
G. B. Blinning
INVENTOR
W. S. Elliott
by Bakewell Byrnes & Parmelee
his attys.

W. S. ELLIOTT.
ROTARY MOTOR.
APPLICATION FILED MAY 22, 1908.

938,228.

Patented Oct. 26, 1909.
2 SHEETS—SHEET 2.

WITNESSES
R A Balderson
J. B. Bluming

INVENTOR
W. S. Elliott
by Bakewell Byrnes & Bakewell
his attys

UNITED STATES PATENT OFFICE.

WILLIAM S. ELLIOTT, OF PITTSBURG, PENNSYLVANIA.

ROTARY MOTOR.

938,228.

Specification of Letters Patent.  Patented Oct. 26, 1909.

Application filed May 22, 1908. Serial No. 434,220.

*To all whom it may concern:*

Be it known that I, WILLIAM S. ELLIOTT, of Pittsburg, Allegheny county, Pennsylvania, have invented a new and useful Improvement in Rotary Motors, of which the following is a full, clear, and exact description, reference being had to the accompanying drawings, forming part of this specification, in which—

Figure 3:
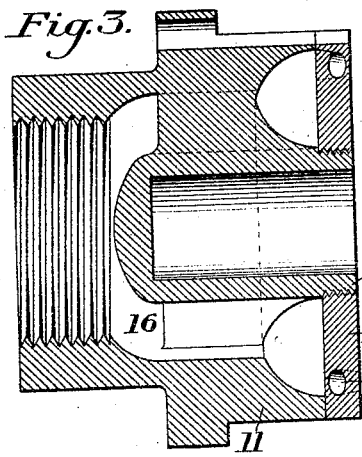
Figure 4:
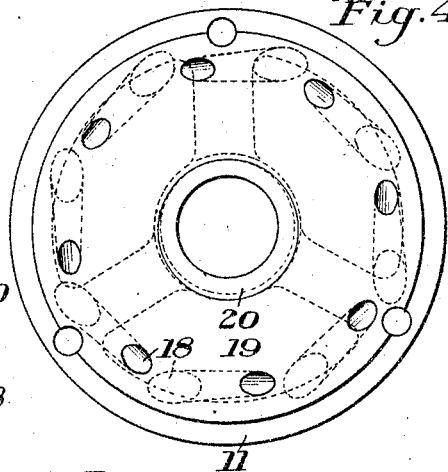
Figure 7:
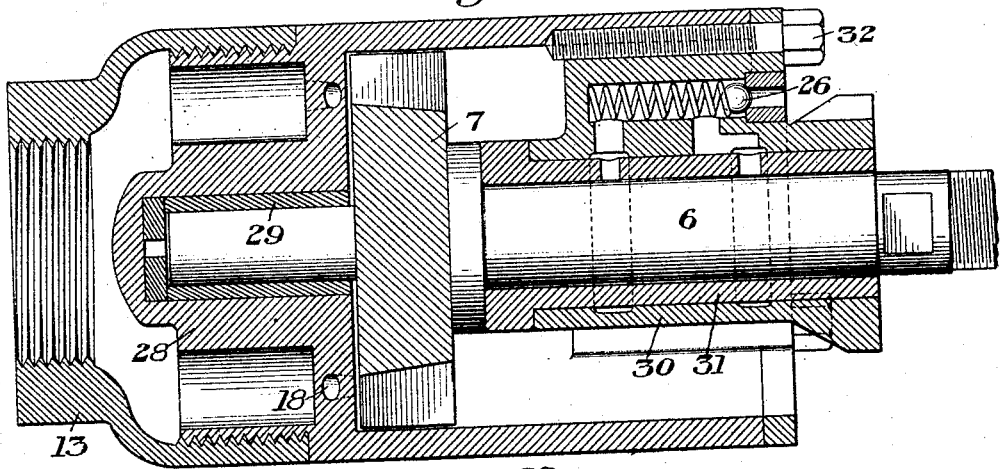
Figure 8:
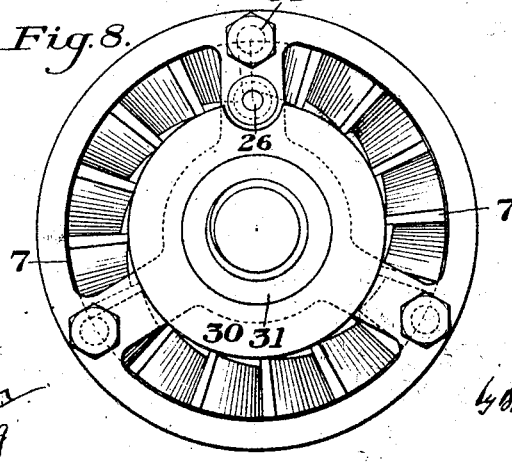

Figure 1 is a longitudinal section of one form of motor embodying my invention; Fig. 2 is a cross-section on the line II—II of Fig. 1; Fig. 3 is a longitudinal section of the rear bearing showing a slightly modified construction; Fig. 4 is an end view of Fig. 3; Figs. 5 and 6 are respectively side and end views of the protecting device for the turbine vanes; Fig. 7 is a longitudinal section showing a modified construction; and Fig. 8 is an end view of Fig. 7.

My invention has relation to the class of rotary motors, and more particularly to turbine motors of this class which are adapted to be operated by hydraulic power.

One object of my invention is to provide a motor of simple, compact and efficient construction which can be used for operating various tools, and which is particularly useful for the operation of boiler-tube cleaners of that type in which the motor is carried through the tube to be cleaned with the cleaning tool.

A further object is to provide a motor of this kind so constructed that one or both of the supports for the motor shaft bearings can be readily removed from the shell or casing of the motor for replacement or repairs without the use of threaded connections of a character likely to become loose in operation.

A further object is to provide means of novel, simple and efficient character for protecting the vanes of the turbine wheel of the motor from wearing contact with the casing or shell and which can be readily removed and replaced when worn.

The precise nature of my invention will be best understood by reference to the accompanying drawings, which will now be described, it being premised, however, that various changes and modifications may be made in the details of construction and arrangement by those skilled in the art without departing from the spirit and scope of my invention as defined in the appended claims.

Referring first to the form of motor which is shown in Figs. 1 to 6, inclusive, the numeral 2 designates the casing or shell of the motor, which, when the motor is designed for operating boiler tube cleaners is of a cylindrical form, although for other purposes it may be of any desired exterior form.

The casing is shown as provided at its front end portion with an integral spider 3, which carries a central support 4 for a removable bushing $4^a$ which forms the front bearing for the shaft 6 of the turbine wheel 7. This bushing is preferably provided with a flange or shoulder 8 at its inner end which seats against the flange 9 at the inner end of the ring 4.

The bearing for the rear end of the shaft 6 is formed by a bushing 10, which is removably seated within a detachable rear head or bearing support member 11, which fits within the open rear end of the casing or shell 2, and is removably secured therein, preferably by means of the screw-bolts 12. The seats for these screw-bolts are formed partly in the head or member 11 and partly in the shell or casing 2, so that the center line of the screw-bolts will be in the line where the outer surface of the member 11 fits the inner surface of the casing or shell 2. The shaft 6 turns in the bushings $4^a$ and 10, its rear thrust being taken by a plug or abutment $10^a$, against which its rear end bears, and which is seated at the rear end of the bushing 10.

The member 11 is formed with a rearward hollow boss or extension 13, formed with an interior thread to receive the threaded shank 14 of a supply pipe or hose. The head or member 11 is of spider construction, as shown in Fig. 4, the space between the arms of the spider forming an admission chamber 16 for the operating fluid. This chamber has an annularly extending portion 17 which communicates with the turbine wheel 7 by means of a series of obliquely directed ports 18 formed in the nozzle plate 19, which constitutes the inner end portion of the member 11. In the construction shown in Fig. 1, this nozzle plate 19 is an integral part of the head. In the construction shown in Figs. 3 and 4, however, it is formed as a separate circular plate, which is screwed onto the threaded central hub or boss 20 of the member 11.

For the purpose of preventing the outer edge of the turbine wheel from rubbing against the interior of the shell or casing, and thereby wearing away the outer edge of the wheel and the edges of the vanes, I provide the device which is shown in detail in Figs. 5 and 6. This device consists of a cylindrical cap member 21, having a flange portion 22, which is made to fit snugly around the periphery of the wheel 7. The front end of the cap covers the ends of the vanes of the wheel, and is provided with the vanes 23, which are at an angle to correspond with the angle of discharge from the vanes of the wheel, so that the water after leaving the vanes of the wheel passes along the vanes 23 until it is clear of the wheel. This cap member is shown as being held in place by screwing the shaft 6 into the wheel 7, the shaft having a shoulder 6ª, against which is seated a washer 23ª which jambs the member 21 up against the front face of the wheel so that said member will revolve with the wheel. The member 21 forms a very simple and effective means for preventing the wear of the outer edge of the wheel, since its outer surface wears against the shell and thereby protects the edges of the wheel vanes, and thus greatly prolongs the life of the wheel. The member 21 is inexpensive in construction, and when the flange 22 becomes worn away, the member can be readily replaced and thus restore the efficiency of the wheel. The flange 22 may, of course, be constructed in various ways and supported from the hub portion of the member.

The casing or shell has the interior space 24 for the discharged water, which escapes at the front end of the shell or case, which is open except for the spider arms which support the front bearing as above described.

25 designates a lubricant passage having branches leading to the front bearing, and normally closed by a spring-pressed ball or valve 26. 27 is a lubricant passage for introducing a lubricant to the rear shaft bearing.

In the modification shown in Fig. 7, the support 28 for the bushing 29, which forms the rear bearing, is made integral with the casing or shell, in the same manner as the front bearing in the form shown in Fig. 1; while the support 30 which carries the bushing 31 which forms the front bearing for the shaft is made removable and is secured within the open end of the casing or shell by the screw-bolts 32, which are similar to the bolts 12 of the construction first described.

It will be obvious that if desired, both the front and rear bearing supports may be made detachable, the rear support being arranged as shown in Fig. 1 in such a case, and the front support being constructed and arranged as shown in Fig. 7.

By making at least one of the bearing supports removable, it will be seen that full access may be had to all the bearing parts for the purpose of renewals or repairs. In the form shown in Fig. 1, the shaft and wheel must of course be inserted from the rear end of the cylinder before the rear member or head 21 is secured in place, while in the form shown in Fig. 7 the shaft and wheel will be inserted from the front end of the casing.

The construction shown in Figs. 7 and 8 forms the subject matter of a divisional application filed by me May 6, 1909, Serial No. 494,417.

What I claim is:—

1. In a rotary motor of the turbine type, a casing or shell, shaft bearings carried by the casing or shell, a shaft supported in the said bearings, a turbine wheel removably secured to the shaft between the bearings, and a cap member seated against the front side of the wheel between the wheel and the front bearing, said member being arranged to rotate with the wheel, and having a flange surrounding the periphery of the wheel, the front wall of said member having vanes which form a continuation of the vanes of the wheel; substantially as described.

2. In a rotary motor of the turbine type, a casing or shell, shaft bearings carried by the casing or shell, a shaft supported in the said bearings, a turbine wheel removably secured to the shaft between the bearings, and a cap member seated against the front side of the wheel between the wheel and the front bearing, said member being arranged to rotate with the wheel, and having a flange surrounding the periphery of the wheel, the front wall of said member having vanes which form a continuation of the vanes of the wheel, together with a washer interposed between the front bearing and the said cap member and holding the same to the wheel; substantially as described.

3. In a rotary motor of the turbine type, a casing or shell, shaft bearings carried by the casing or shell, a shaft supported in the said bearings, a turbine wheel removably secured to the shaft between the bearings, and a cap member seated against the front side of the wheel between the wheel and the front bearing, said member being arranged to rotate with the wheel, and having a flange surrounding the periphery of the wheel, the front wall of said member having vanes which form a continuation of the vanes of the wheel, one of the shaft bearings being removable to permit of the removal of the cap member at one end of the casing or shell; substantially as described.

4. In a rotary motor of the turbine type, a protecting device for the turbine wheel, consisting of a member arranged to rotate with the wheel and having a flange surrounding the periphery of the wheel and having its forward wall provided with vanes which form a continuation of the vanes of the wheel; substantially as described.

5. In a rotary motor of the turbine type, the combination with a casing or shell, shaft bearings carried by the casing or shell, a shaft supported in said bearings, a turbine wheel secured on said shaft, and a cap member seated against the front side of the wheel to rotate therewith and having vanes which register with the vanes of the wheel, and also a flange portion which fits around the periphery of the wheel; substantially as described.

6. In a rotary motor of the turbine type, a protecting device for the turbine wheel, consisting of a member arranged to rotate with the wheel and having a flange surrounding the periphery of the wheel and having its forward wall provided with vanes, which are inclined in the same direction as the discharge of the vanes of the wheel; substantially as described.

In testimony whereof, I have hereunto set my hand.

WILLIAM S. ELLIOTT.

Witnesses:
GEO. H. PARMELEE.
H. M. CORWIN.